United States Patent
Tsuchiya

(10) Patent No.: US 9,800,789 B2
(45) Date of Patent: Oct. 24, 2017

(54) CAMERA SYSTEM WITH IMAGE BLUR CORRECTION

(71) Applicant: OLYMPUS CORPORATION, Hachioji-shi, Tokyo (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/212,846

(22) Filed: Jul. 18, 2016

(65) Prior Publication Data

US 2016/0330377 A1    Nov. 10, 2016

Related U.S. Application Data

(63) Continuation of application No. PCT/JP2015/050186, filed on Jan. 6, 2015.

(30) Foreign Application Priority Data

Jan. 30, 2014    (JP) .................................. 2014-015754

(51) Int. Cl.
*H04N 5/232*    (2006.01)
*G03B 17/14*    (2006.01)
*G03B 5/00*    (2006.01)

(52) U.S. Cl.
CPC ........... *H04N 5/23287* (2013.01); *G03B 5/00* (2013.01); *G03B 17/14* (2013.01);
(Continued)

(58) Field of Classification Search
CPC ........... H04N 5/23287; H04N 5/23209; H04N 5/23258; G03B 17/14; G03B 5/00; G03B 2205/0007
See application file for complete search history.

(56) References Cited

U.S. PATENT DOCUMENTS 6,320,613 B1   11/2001   Shiomi
2005/0140793 A1   6/2005   Kojima
(Continued)

FOREIGN PATENT DOCUMENTS

JP   H08-006086 A   1/1996
JP   2005-189654 A   7/2005
(Continued)

OTHER PUBLICATIONS

International Search Report mailed in corresponding International Patent Application No. PCT/JP2015/050186 on Apr. 14, 2015, consisting of 5 pp. (English Translation Provided).

*Primary Examiner* — Christopher K Peterson
(74) *Attorney, Agent, or Firm* — Volpe and Koenig, P.C.

(57) ABSTRACT

In a camera system that includes a lens unit and a camera body, the camera body includes: an image blur detecting unit that detects image blur in a plurality of directions; an image blur correcting unit that performs image blur correction in the plurality of directions; a determining unit that determines whether a mounted lens unit is a lens unit that performs the image blur correction; and an image blur correction control unit that performs control in such a way that, when a determination result of the determining unit is true (Yes), the image blur correcting unit performs the image blur correction only in specific directions from among the plurality of directions, and that performs control in such a way that, when the determination result of the determining unit is false (No), the image blur correcting unit performs the image blur correction in the plurality of directions.

6 Claims, 18 Drawing Sheets

(52) U.S. Cl.
 CPC ..... *H04N 5/23209* (2013.01); *H04N 5/23258* (2013.01); *G03B 2205/0007* (2013.01)

(56) References Cited

U.S. PATENT DOCUMENTS

2010/0194897 A1* 8/2010 Yumiki ............... G03B 7/091
                                                348/208.4
2010/0245603 A1   9/2010 Hashi

FOREIGN PATENT DOCUMENTS

| JP | 2008-040085 A  | 2/2008 |
| JP | 2013-174639 A  | 9/2013 |
| WO | 2009/060624 A1 | 5/2009 |

\* cited by examiner

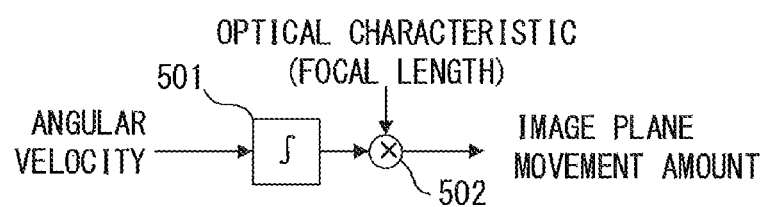
F I G. 5 A

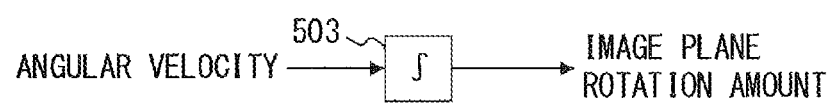
F I G. 5 B

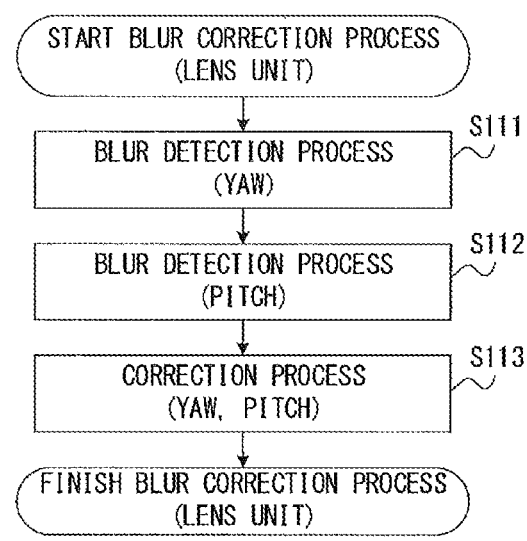
F I G. 8

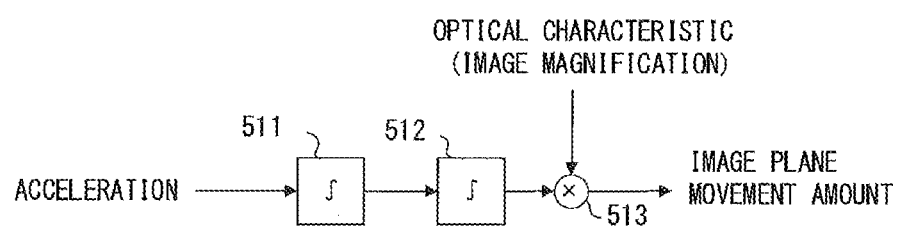
F I G. 12

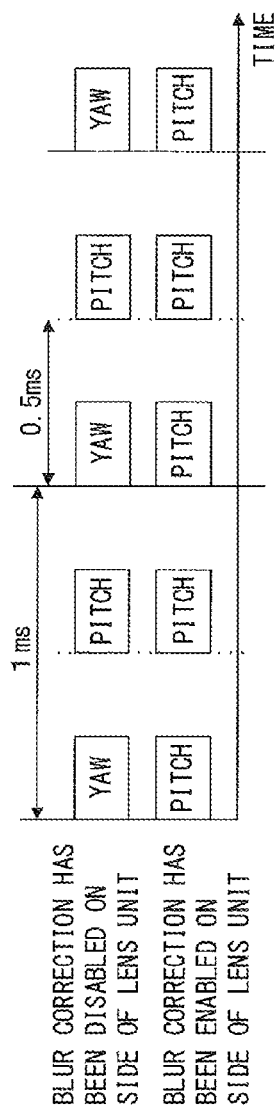
F I G. 17

CAMERA SYSTEM WITH IMAGE BLUR CORRECTION

CROSS-REFERENCE TO RELATED APPLICATIONS

This application is based upon and claims the benefit of priority of the prior Japanese Patent Application No. 2014-015754, filed Jan. 30, 2014, the entire contents of which are incorporated herein by reference.

This is a Continuation Application of PCT Application No. PCT/JP2015/050186, filed Jan. 6, 2015, which was not published under PCT Article 21(2) in English.

FIELD

The present invention relates to a camera system that includes a lens unit and a camera body that the lens unit can be attached to or detached from, and in particular, a camera system having a blur correction function for correcting image blur caused by camera shake or the like.

BACKGROUND

In recent years, cameras equipped with a blur correction function for correcting image blur caused by camera shake or the like (hereinafter also referred to as an "image stabilization function") have become popular, and a photographer can capture a satisfactory image having no image blur without paying any special attention to camera shake or the like.

As an example, there are two types of camera systems of a lens-interchangeable camera in which photographing lenses can be interchanged according to the purpose of photographing: a camera system in which the image stabilization function is installed onto an interchangeable lens, and a camera system in which the image stabilization function is installed onto a camera body. When the image stabilization function is installed onto an interchangeable lens, a sensor to detect the movement of a camera is mounted onto the interchangeable lens, and a portion of a photographing lens group is moved in a direction in which a detected camera shake is cancelled such that image stabilization is performed. When the image stabilization function is installed onto a camera body, a sensor to detect the movement of a camera is mounted onto the camera body, and an image sensor is moved in a direction in which a detected camera shake is cancelled such that image stabilization is performed. Whether the image stabilization function is installed onto the interchangeable lens or the camera body depends on a camera system or a manufacturer, because both types of camera systems have advantages and disadvantages.

In some of the camera systems having a common standard, both an interchangeable lens and a camera body have the image stabilization function.

As an example, a technology is known in which, in a camera system that includes a camera body including an image blur correcting unit for a body, and an interchangeable lens including an image blur correcting unit for a lens, the image blur correcting unit for the lens is set to be in a state in which correction has been enabled substantially at the same time that an imaging unit starts to prepare exposure or before the imaging unit starts to prepare exposure, and when exposure is started, the image blur correcting unit for the lens is set to be in a state in which correction has been disabled, and the image blur correcting unit for the body is set to be in a state in which correction has been enabled (see Japanese Laid-Open Patent Publication No. 2008-40085). In this technology, the image blur correcting unit for the body and the image blur correcting unit for the lens do not perform an operation simultaneously, and therefore a photographer is not likely to fail in photographing.

SUMMARY

In an aspect of the present invention, a camera system is provided that includes a lens unit and a camera body that the lens unit is attached to or detached from. The camera body includes: an image blur detecting unit that detects image blur in a plurality of directions, the image blur being associated with movement of the camera system in the plurality of directions; an image blur correcting unit that performs image blur correction in the plurality of directions; a determining unit that determines whether the lens unit mounted onto the camera body is a lens unit that performs the image blur correction; and an image blur correction control unit that performs control in such a way that, when the determining unit determines that the lens unit mounted onto the camera body is the lens unit that performs the image blur correction, the image blur correcting unit performs the image blur correction only in specific directions from among the plurality of directions, the specific directions including at least a roll direction that is a direction of rotation with respect to an optical-axis direction of the lens unit, and that performs control in such a way that, when the determining unit determines that the lens unit mounted onto the camera body is not the lens unit that performs the image blur correction, the image blur correcting unit performs the image blur correction in the plurality of directions including the specific directions. The image blur correction control unit performs control in such a way that an image blur correction cycle in the specific directions when the image blur correcting unit performs the image blur correction only in the specific directions is shorter than the image blur correction cycle in the specific directions when the image blur correcting unit performs the image blur correction in the plurality of directions.

BRIEF DESCRIPTION OF DRAWINGS

FIG. 5A illustrates an example of an internal configuration of each of a yaw-angle blur amount calculating unit and a pitch-angle blur amount calculating unit according to the first embodiment.

FIG. 5B illustrates an example of an internal configuration of a roll-angle blur amount calculating unit according to the first embodiment.

FIG. 8 is a flowchart illustrating the processing content of a blur correction operation performed by a lens unit according to the first embodiment.

FIG. 12 illustrates an example of an internal configuration of each of an X parallel blur amount calculating unit and a Y parallel blur amount calculating unit according to the second embodiment.

FIG. 17 is a diagram explaining examples of a blur correction cycle in a camera body that can perform blur correction in a case in which a lens unit mounted onto the camera body is a lens unit in which blur correction has been disabled and in a case in which the mounted lens unit is not a lens unit in which blur correction is disabled in the camera system according to the third embodiment.

DESCRIPTION OF EMBODIMENTS

Embodiments of the present invention are described below with reference to the drawings.

First, directions of a camera system according to each of the embodiments described below are defined.

Figure 1:
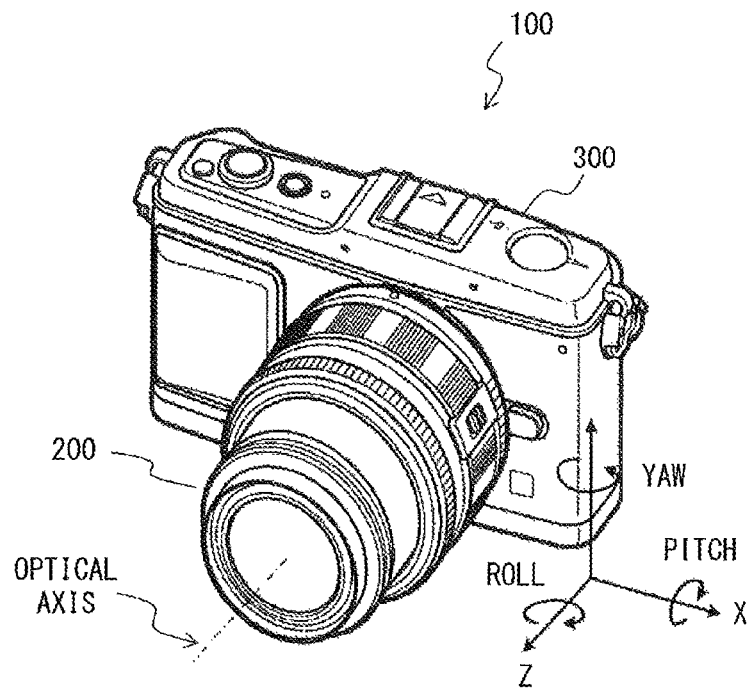
FIG. 1 is a diagram explaining directions of a camera system according to respective embodiments.

FIG. 1 is a diagram explaining the directions.

As illustrated in FIG. 1, a camera system 100 according to each of the embodiments has a configuration in which a lens unit 200 is mounted onto a camera body 300. In the camera system 100, an X direction, a Y direction, a Z direction, a pitch direction, a yaw direction, and a roll direction are defined as below.

Rightward and leftward directions (a horizontal direction) of the camera body 300 mounted with the lens unit 200 are defined to be an X direction. For convenience of explanation, a rightward direction when viewing the camera system 100 from the front is defined to be a + (plus, positive) direction (a +X direction), and a leftward direction is defined to be a − (minus, negative) direction (a −X direction). The X direction corresponds to rightward and leftward directions of an imaging plane of an image sensor described later.

Upward and downward directions (a vertical direction) of the camera body 300 mounted with the lens unit 200 are defined to be a Y direction. For convenience of explanation, the upward direction is defined to be a +direction (a +Y direction), and the downward direction is defined to be a −direction (a −Y direction). The Y direction corresponds to upward and downward directions of the imaging plane of the image sensor described later.

An optical-axis direction of the camera body 300 mounted with the lens unit 200 is defined to be a Z direction. For convenience of explanation, a direction from a back surface to a front surface of the camera system 100 is defined to be a + direction (a +Z direction), and a direction from the front surface to the back surface of the camera system 100 is defined to be a −direction (a −Z direction).

A rotation direction with an X-direction axis as a rotary shaft is defined to be a pitch direction. For convenience of explanation, a leftward rotation with respect to the +X direction is defined to a +direction (a +pitch direction), and a rightward rotation with respect to the +X direction is defined to be a −direction (a −pitch direction).

A rotation direction with a Y-direction axis as a rotary shaft is defined to be a yaw direction. For convenience of explanation, a rightward rotation with respect to the +Y direction is defined to be a +direction (a +yaw direction), and a leftward rotation with respect to the +Y direction is defined to be a −direction (a −yaw direction).

A rotation direction with a Z-direction axis as a rotary shaft is defined to be a roll direction. For convenience of explanation, a leftward rotation with respect to the +Z direction is defined to be a +direction (a +roll direction), and a rightward rotation with respect to the +Z direction is defined to be a −direction (a −roll direction).

The positive/negative (+/−) direction defined above is dependent on a mounting direction of an angular velocity sensor or an acceleration sensor described later, and of course, the positive/negative (+/−) direction is not limited to the definition above.

First Embodiment

Figure 2:
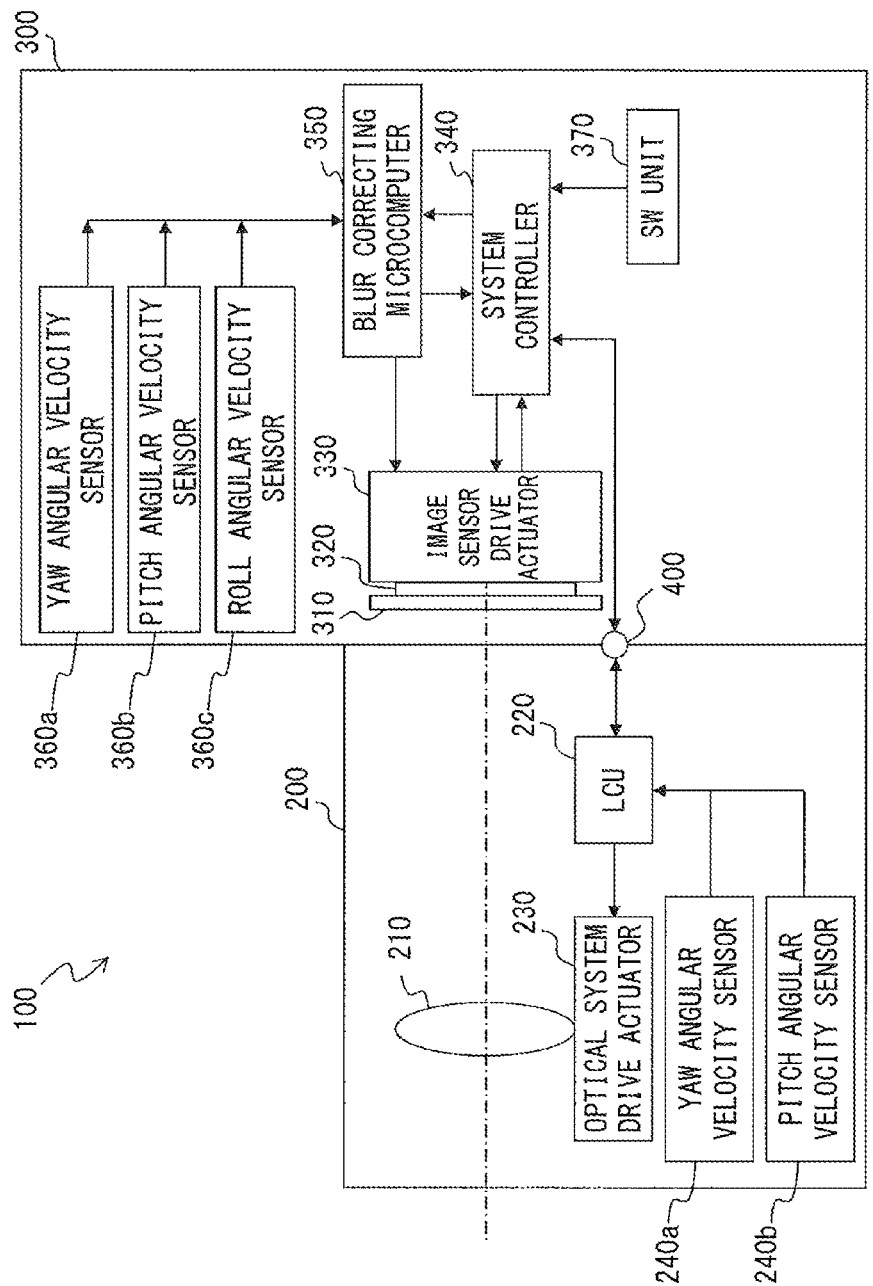
FIG. 2 illustrates an exemplary configuration of a camera system according to a first embodiment.

FIG. 2 illustrates an exemplary configuration of a camera system according to a first embodiment.

As illustrated in FIG. 2, a camera system 100 according to this embodiment has a configuration in which a lens unit 200 is mounted onto a camera body 300. The camera body 300 is configured in such a way that the lens unit 200 can be attached to or detached from the camera body 300. The lens unit 200 is mounted onto the camera body 300 by fitting a mount adapter (not illustrated) provided in the lens unit 200 into a mount adapter (not illustrated) provided in the camera body 300. Consequently, the lens unit 200 is fixed to the camera body 300, and terminals provided in the respective mount adapters are electrically connected to each other. Accordingly, communication can be performed between the lens unit 200 and the camera body 300 via a contact 400.

The lens unit 200 includes an optical system 210, an LCU (lens control unit) 220, an optical system drive actuator 230, a yaw angular velocity sensor 240a, and a pitch angular velocity sensor 240b.

The optical system 210 includes a blur correcting lens group, and condenses a light flux from a subject so as to form a subject image on an imaging plane of an image sensor 320.

The optical system drive actuator 230 moves the blur correcting lens group that is a portion of the optical system 210 on a plane orthogonal to an optical axis, under the control of the LCU 220.

The yaw angular velocity sensor 240a detects an angular velocity in the yaw direction. The pitch angular velocity sensor 240b detects an angular velocity in the pitch direction.

The LCU 220 communicates with a system controller 340 via the contact 400, and controls the entire operation of the lens unit 200. As an example, the LCU 220 transmits information relating to the lens unit 200 to the system controller 340, or obtains, from the system controller 340, information relating to the camera body 300 or an instruction to start or finish blur correction. As another example, the LCU 220 controls the optical system drive actuator 230 so as to move the blur correcting lens group in a direction in which image blur (blurring of the subject image formed on the imaging plane of the image sensor 320) is cancelled, in accordance with the angular velocities detected by the yaw angular velocity sensor 240a and the pitch angular velocity sensor 240b. As yet another example, the LCU 220 performs focus control, diaphragm control, and the like. The internal configuration of the LCU 220 is described below with reference to FIG. 3.

The camera body 300 includes a focal plane shutter (hereinafter simply referred to as a "shutter") 310, an image sensor 320, an image sensor drive actuator 330, a system controller 340, a blur correcting microcomputer 350, a yaw angular velocity sensor 360a, a pitch angular velocity sensor 360b, a roll angular velocity sensor 360c, and an SW (switch) unit 370.

The shutter 310 is arranged on a front side of the imaging plane of the image sensor 320. The shutter 310 includes an aperture blade, and the shutter 310 controls exposure time by opening or closing the aperture blade under the control of the system controller 340.

The image sensor 320 converts the subject image formed on the imaging plane via the shutter 310 with the aperture blade open into an electric signal, and outputs the electric signal as a video signal to the system controller 340, under the control of the system controller 340.

The image sensor drive actuator 330 moves the image sensor 320 in the X direction and the Y direction that are parallel to the imaging plane, and the image sensor drive actuator 330 rotates the image sensor 320 so as to be parallel to the imaging plane, under the control of the blur correcting microcomputer 350. The drive mechanism of the image sensor drive actuator 330 is described below with reference to FIG. 6.

The system controller 340 communicates with the LCU 220 via the contact 400, and communicates with the blur correcting microcomputer 350, and the system controller 340 controls the entire operation of the camera body 300 and the camera system 100. As an example, the system controller 340 obtains information relating to the lens unit 200 from the LCU 220, or transmits, to the LCU 220, information relating to the camera body 300 or an instruction to start or finish blur correction. As another example, the system controller 340 determines whether the lens unit 200 mounted onto the camera body 300 is a lens unit that can perform blur correction on the basis of the information relating to the lens unit 200. In this determination, it is determined that, for example, a lens unit that does not have a blur correction function, or a lens unit having a blur correction function in which the blur correction function has been disabled, is not a lens unit that can perform blur correction. The blur correction function can be disabled, for example, by a user operating an operating unit provided in the lens unit. As yet another example, the system controller 340 converts the video signal output from the image sensor 320 into image data. As yet another example, the system controller 340 transmits, to the blur correcting microcomputer 350, information relating to an optical characteristic of the optical system 210 that is included in the information relating to the lens unit 200, a determination result indicating whether the lens unit 200 is a lens unit that can perform blur correction, or an instruction to start or finish blur correction.

The blur correcting microcomputer 350 communicates with the system controller 340, and the blur correcting microcomputer 350 performs blur correction under the control of the system controller 340. As an example, the blur correcting microcomputer 350 obtains, from the system controller 340, information relating to the optical characteristic of the optical system 210, a determination result indicating whether the lens unit 200 is a lens unit that can perform blur correction, or an instruction to start or finish blur correction. As another example, the blur correcting microcomputer 350 controls the image sensor drive actuator 330 so as to move the image sensor 320 in a direction in which image blur is cancelled, in accordance with angular velocities detected by the yaw angular velocity sensor 360a, the pitch angular velocity sensor 360b, and the roll angular velocity sensor 360c, or the angular velocity detected by the roll angular velocity sensor 360c. The internal configuration of the blur correcting microcomputer 350 is described below with reference to FIG. 4.

The yaw angular velocity sensor 360a detects an angular velocity in the yaw direction. The pitch angular velocity sensor 360b detects an angular velocity in the pitch direction. The roll angular velocity sensor 360c detects an angular velocity in the roll direction.

The SW unit 370 receives various instructions, such as an instruction to start photographing, from a user, and transmits the various instructions to the system controller 340.

In the camera system 100, each of the LCU 220, the system controller 340, and the blur correcting microcomputer 350 includes, for example, a CPU, a memory, and the like (not illustrated), and each of the LCU 220, the system controller 340, and the blur correcting microcomputer 350 controls the various operations described above and below by the CPU loading and executing a program stored in the memory.

In the camera system 100, all of the yaw angular velocity sensors 240a and 360a, the pitch angular velocity sensors 240b and 360b, and the roll angular velocity sensor 360c are angular velocity sensors having the same function, but of course, they are mounted in different directions according to a detection direction.

In the camera system 100, the yaw angular velocity sensor 360a, the pitch angular velocity sensor 360b, and the roll angular velocity sensor 360c are examples of a blur detecting unit that detects blurring in a plurality of directions. The image sensor drive actuator 330 is an example of a blur correcting unit that performs blur correction in a plurality of directions. A portion of the system controller 340 is an example of a determining unit that determines whether a lens unit mounted onto a camera body is a lens unit that can perform blur correction. The blur correcting microcomputer 350 is an example of a blur correction control unit that controls the blur correcting unit to perform blur correction only in a specific direction of the plurality of directions when the determining unit determines that the lens unit mounted onto the camera body is a lens unit that can perform blur correction, and that controls the blur correcting unit to perform blur correction in the plurality of directions when the determining unit determines that the lens unit mounted onto the camera body is not a lens unit that can perform blur correction.

Figure 3:
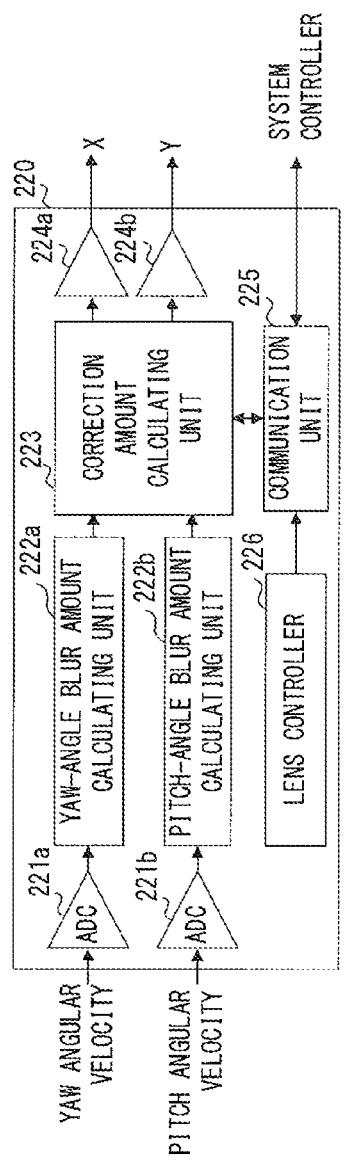
FIG. 3 illustrates an example of an internal configuration of an LCU according to the first embodiment.

FIG. 3 illustrates an example of the internal configuration of the LCU 220.

As illustrated in FIG. 3, the LCU 220 includes ADCs (Analog-to-Digital Converters) 221a and 221b, a yaw-angle blur amount calculating unit 222a, a pitch-angle blur amount calculating unit 222b, a correction amount calculating unit 223, drivers 224a and 224b, a communication unit 225, and a lens controller 226.

The ADC 221a converts a detection result that has been output as an analog signal by the yaw angular velocity sensor 240a into a digital signal. The ADC 221b converts a detection result that has been output as an analog signal by the pitch angular velocity sensor 240b into a digital signal.

The yaw-angle blur amount calculating unit 222a calculates an image plane movement amount in the X direction (an image blur amount associated with blurring in the yaw direction) on the basis of an angular velocity in the yaw direction that is indicated by a conversion result of the ADC 221a and an optical characteristic (a focal length of the optical system 210). The pitch-angle blur amount calculating unit 222b calculates an image plane movement amount in the Y direction (an image blur amount associated with blurring in the pitch direction) on the basis of an angular velocity in the pitch direction that is indicated by a conversion result of the ADC 221b and an optical characteristic (the focal length of the optical system 210). The internal configuration of each of the yaw-angle blur amount calculating unit 222a and the pitch-angle blur amount calculating unit 222b is described below with reference to FIG. 5A.

The correction amount calculating unit 223 calculates movement amounts in the X direction and the Y direction to move the blur correcting lens group in a direction in which image blur is cancelled, on the basis of calculation results of the yaw-angle blur amount calculating unit 222a and the pitch-angle blur amount calculating unit 222b.

The driver 224a outputs, to the optical system drive actuator 230, a driving pulse signal according to the movement amount in the X direction calculated by the correction amount calculating unit 353. The driver 224b outputs, to the optical system drive actuator 230, a driving pulse signal according to the movement amount in the Y direction calculated by the correction amount calculating unit 223.

The communication unit 225 communicates with the system controller 340, and as an example, the communication unit 225 transmits information relating to the lens unit 200, or obtains information relating to the camera body 300 or an instruction to start or finish blur correction. The communication unit 225 also performs communication relating to, for example, focus control, diaphragm control, and the like.

The lens controller 226 controls the entire operation of the LCU 220 (the lens unit 200). As an example, the lens controller 226 performs control to transmit information relating to the lens unit 200 to the system controller 340, control to transmit information relating to an optical characteristic of the optical system 210 to the yaw-angle blur amount calculating unit 222a and the pitch-angle blur amount calculating unit 222b, and other control. As another example, the lens controller 226 performs focus control, diaphragm control, and the like.

Figure 4:
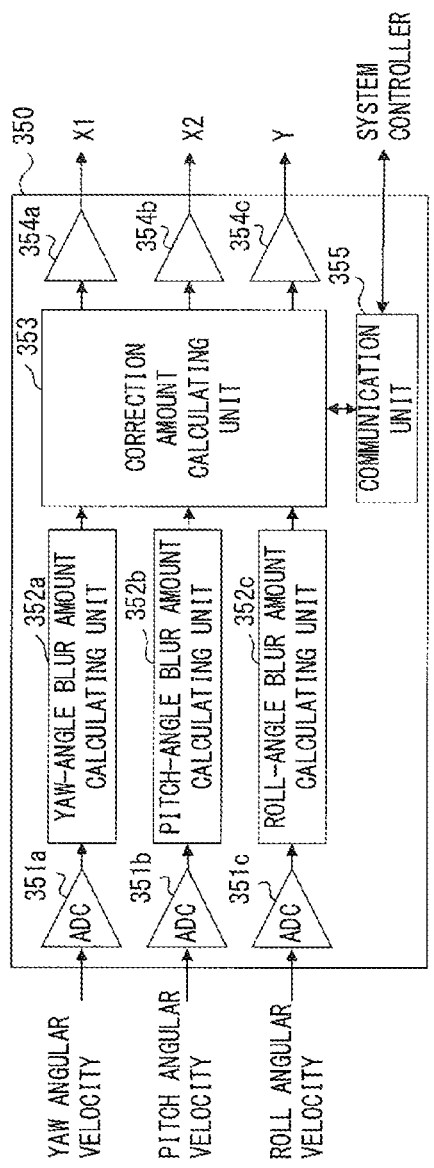
FIG. 4 illustrates an example of an internal configuration of a blur correcting microcomputer according to the first embodiment.

FIG. 4 illustrates an example of the internal configuration of the blur correcting microcomputer 350.

As illustrated in FIG. 4, the blur correcting microcomputer 350 includes ADCs 351a, 351b, and 351c, a yaw-angle blur amount calculating unit 352a, a pitch-angle blur amount calculating unit 352b, a roll-angle blur amount calculating unit 352c, a correction amount calculating unit 353, drivers 354a, 354b, and 354c, and a communication unit 355.

The ADC 351a converts a detection result that has been output as an analog signal by the yaw angular velocity sensor 360a into a digital signal. The ADC 351b converts a detection result that has been output as an analog signal by the pitch angular velocity sensor 360b into a digital signal. The ADC 351c converts a detection result that has been output as an analog signal by the roll angular velocity sensor 360c into a digital signal.

The yaw-angle blur amount calculating unit 352a calculates an image plane movement amount in the X direction (an image blur amount associated with blurring in the yaw direction) on the basis of an angular velocity in the yaw direction that is indicated by a conversion result of the ADC 351a and an optical characteristic (the focal length of the optical system 210). The pitch-angle blur amount calculating unit 352b calculates an image plane movement amount in the Y direction (an image blur amount associated with blurring in the pitch direction) on the basis of an angular velocity in the pitch direction that is indicated by a conversion result of the ADC 351b and an optical characteristic (the focal length of the optical system 210). The roll-angle blur amount calculating unit 352c calculates an image plane rotation amount (an image blur amount associated with blurring in the roll direction) on the basis of an angular velocity in the roll direction that is indicated by a conversion result of the ADC 351c. Respective internal configurations of the yaw-angle blur amount calculating unit 352a, the pitch-angle blur amount calculating unit 352b, and the roll-angle blur amount calculating unit 352c are described below with reference to FIGS. 5A and 5B.

The correction amount calculating unit 353 calculates respective movement amounts on an X1 axis, an X2 axis, and a Y axis to move the image sensor 320 in a direction in which image blur is cancelled, on the basis of calculation results of the yaw-angle blur amount calculating unit 352a, the pitch-angle blur amount calculating unit 352b, and the roll-angle blur amount calculating unit 352c. Alternatively, the correction amount calculating unit 353 calculates respective movement amounts on the X1 axis and the X2 axis to move the image sensor 320 in a direction in which image blur is cancelled, on the basis of a calculation result of the roll-angle blur amount calculating unit 352c. Each of the X1 axis, the X2 axis, and the Y axis is described below with reference to FIG. 6.

The driver 354a outputs, to the image sensor drive actuator 330, a driving pulse signal according to the movement amount on the X1 axis calculated by the correction amount calculating unit 353. The driver 354b outputs, to the image sensor drive actuator 330, a driving pulse signal according to the movement amount on the X2 axis calculated by the correction amount calculating unit 353. The driver 354c outputs, to the image sensor drive actuator 330, a driving pulse signal according to the movement amount on the Y axis calculated by the correction amount calculating unit 353.

The communication unit 355 communicates with the system controller 340, and obtains, for example, information relating to the optical characteristic of the optical system 210, a determination result indicating whether the lens unit 200 is a lens unit that can perform blur correction, or an instruction to start or finish blur correction.

FIG. 5A illustrates an example of the internal configuration of each of the yaw-angle blur amount calculating units 222a and 352a and the pitch-angle blur amount calculating units 222b and 352b. FIG. 5B illustrates an example of the internal configuration of the roll-angle blur amount calculating unit 352c.

As illustrated in FIG. 5A, each of the yaw-angle blur amount calculating units 222a and 352a and the pitch-angle blur amount calculating units 222b and 352b includes an integrator 501 and a multiplier 502. The integrator 501 time-integrates an input angular velocity so as to calculate an angular variation. The multiplier 502 multiplies a calculation result of the integrator 501 by an optical characteristic (the focal length of the optical system 210) so as to calculate an image plane movement amount.

As illustrated in FIG. 5B, the roll-angle blur amount calculating unit 352c includes an integrator 503. The integrator 503 time-integrates an input angular velocity so as to calculate an angular variation (an image plane rotation amount).

Figure 6:
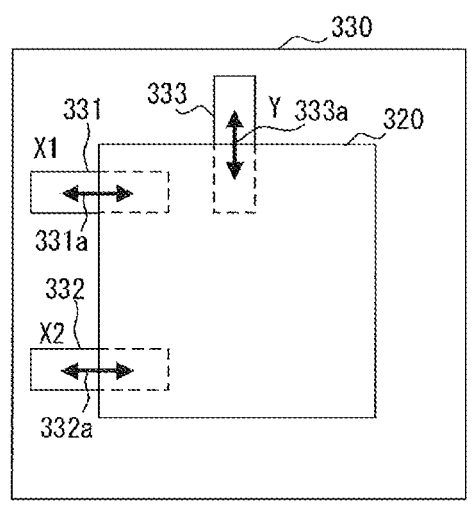
FIG. 6 illustrates an example of a drive mechanism of an image sensor drive actuator according to the first embodiment.

FIG. 6 illustrates an example of a drive mechanism of the image sensor drive actuator 330.

As illustrated in FIG. 6, the image sensor drive actuator 330 includes three drive units (actuators), an X1 drive actuator 331, an X2 drive actuator 332, and a Y drive actuator 333.

The X1 drive actuator 331 moves a fulcrum of a portion of the image sensor 320 (for example, a fulcrum of a left-upper portion of the image sensor 320 illustrated in FIG. 6) in a direction of the X1 axis indicated by a double-headed arrow 331a. The X2 drive actuator 332 moves a fulcrum of a portion of the image sensor 320 (for example, a fulcrum of a left-lower portion of the image sensor 320 illustrated in FIG. 6) in a direction of the X2 axis indicated by a double-headed arrow 332a. The image sensor 320 can be moved or rotated in the X direction by being driven by the X1 drive actuator 331 and the X2 drive actuator 332, as described above. More specifically, when the image sensor 320 is moved in the X direction, the drive amounts of the X1 drive actuator 331 and the X2 drive actuator 332 have the same sign (a plus/minus sign) and the same magnification. When the image sensor 320 is rotated, the drive amounts of the X1 drive actuator 331 and the X2 drive actuator 332 have different signs (plus sign or minus sign), but have the same magnification. The image sensor 320 is configured to rotate in parallel to an imaging plane with the center of the imaging plane as the center of rotation, although this is not illustrated. The image sensor 320 is moved or rotated in the X direction, as described above, and therefore a correction stroke to move the image sensor 320 in the X direction and a correction stroke to rotate the image sensor 320 are secured in the X1 drive actuator 331 and the X2 drive actuator 332.

The Y drive actuator 333 moves the image sensor 320 in a direction of the Y axis indicated by a double-headed arrow 333a (the Y direction). The Y drive actuator 333 above allows the image sensor 320 to move in the Y direction.

A blur correction operation of the camera system 100 according to this embodiment is described next.

The blur correction operation is performed under the control of the system controller 340. During a period after an instruction to start blur correction is transmitted from the system controller 340 to the lens unit 200 and the camera body 300 and before an instruction to finish blur correction is transmitted from the system controller 340 to the lens unit 200 and the camera body 300, the following blur correction operations are respectively performed by the lens unit 200 and the camera body 300. Here, a blur correction operation performed by the camera body 300 is described first, and a blur correction operation performed by the lens unit 200 is described next.

Figure 7:
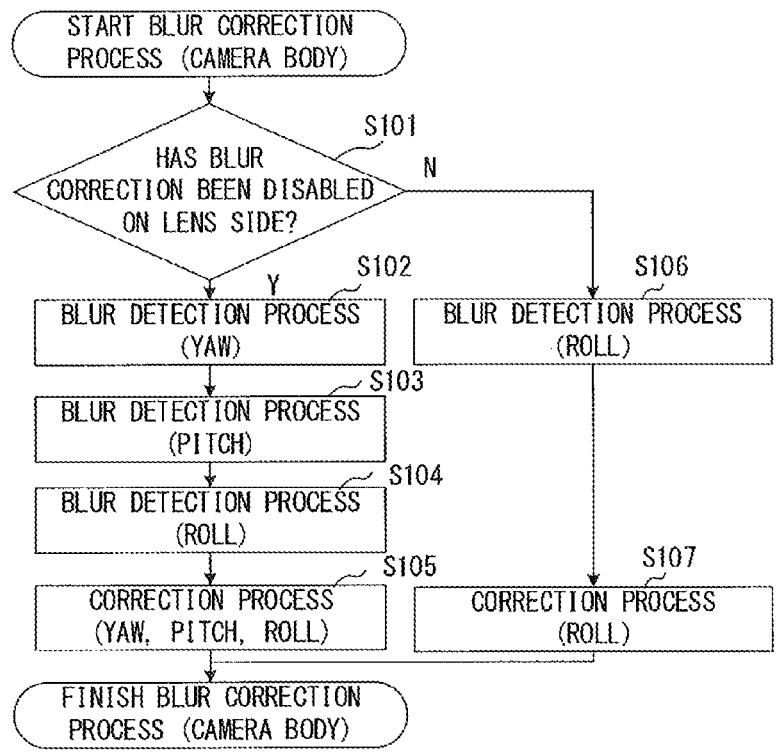
FIG. 7 is a flowchart illustrating the processing content of a blur correction operation performed by a camera body according to the first embodiment.

FIG. 7 is a flowchart illustrating the processing content of the blur correction operation performed by the camera body 300.

As illustrated in FIG. 7, the blur correcting microcomputer 350 that has received an instruction to start blur correction first determines whether the lens unit 200 mounted onto the camera body 300 is a lens unit in which blur correction has been disabled (S101). This determination is performed according to a determination result transmitted from the system controller 340 that indicates whether the lens unit 200 is a lens unit that can perform blur correction in the yaw direction and the pitch direction. Stated another way, when the determination result transmitted from the system controller 340 indicates that the lens unit 200 is a lens unit that can perform blur correction in the yaw direction and the pitch direction, the determination result in S101 is No. When the determination result transmitted from the system controller 340 indicates that the lens unit 200 is not a lens unit that can perform blur correction in the yaw direction and the pitch direction, the determination result in S101 is Yes.

When the determination result in S101 is Yes, the blur correcting microcomputer 350 performs a blur detection process in the yaw direction (S102). More specifically, the blur correcting microcomputer 350 causes the ADC 351a and the yaw-angle blur amount calculating unit 352a to calculate an image plane movement amount in the X direction (an image blur amount associated with blurring in the yaw direction) on the basis of a detection result of the yaw angular velocity sensor 360a. Then, the blur correcting microcomputer 350 performs a blur detection process in the pitch direction (S103). More specifically, the blur correcting microcomputer 350 causes the ADC 351b and the pitch-angle blur amount calculating unit 352b to calculate an image plane movement amount in the Y direction (an image blur amount associated with blurring in the pitch direction) on the basis of a detection result of the pitch angular velocity sensor 360b. The blur correcting microcomputer 350 then performs a blur detection process in the roll direction (S104). More specifically, the blur correcting microcomputer 350 causes the ADC 351c and the roll-angle blur amount calculating unit 352c to calculate an image plane rotation amount (an image blur amount associated with blurring in the roll direction) on the basis of a detection result of the roll angular velocity sensor 360c. The blur correcting microcomputer 350 performs a blur correction process on the basis of calculation results in S102 to S104 (S105). More specifically, the blur correcting microcomputer 350 causes the correction amount calculating unit 353 and the drivers 354a, 354b, and 354c to output, to the image sensor drive actuator 330, a driving pulse signal according to respective movement amounts on the X1 axis, the X2 axis, and the Y axis on the basis of the calculation results, and the image sensor drive actuator 330 moves the image sensor 320 in response to the driving pulse signal.

When the determination result in S101 is No, the blur correcting microcomputer 350 performs a blur detection process in the roll direction (S106). The process of S106 is similar to the process of S104, and the detailed description thereof is omitted. The blur correcting microcomputer 350 performs a blur correction process on the basis of a calculation result in S106 (S107). More specifically, the blur correcting microcomputer 350 causes the correction amount calculating unit 353 and the drivers 354a and 354b to output, to the image sensor drive actuator 330, a driving pulse signal according to respective movement amounts on the X1 axis and the X2 axis on the basis of the calculation result, and the image sensor drive actuator 330 moves (rotates) the image sensor 320 in response to the driving pulse signal.

When the process of S105 or S107 is completed, the processing is terminated.

The processing illustrated in FIG. 7 represents one cycle of a blur correction operation performed by the camera body 300. Actually, one cycle of the blur correction operation is repeated until an instruction to finish blur correction is transmitted from the system controller 340 to the blur correcting microcomputer 350.

FIG. 8 is a flowchart illustrating the processing content of the blur correction operation performed by the lens unit 200.

As illustrated in FIG. 8, the LCU 220 that has received an instruction to start blur correction first performs a blur detection process in the yaw direction (S111). More specifically, the LCU 220 causes the ADC 221a and the yaw-angle blur amount calculating unit 222a to calculate an image plane movement amount in the X direction (an image blur amount associated with blurring in the yaw direction) on the basis of a detection result of the yaw angular velocity sensor 240a.

Then, the LCU 220 performs a blur detection process in the pitch direction (S112). More specifically, the LCU 220 causes the ADC 221b and the pitch-angle blur amount calculating unit 222b to calculate an image plane movement amount in the Y direction (an image blur amount associated with blurring in the pitch direction) on the basis of a detection result of the pitch angular velocity sensor 240b.

The LCU 220 performs a blur correction process on the basis of calculation results in S111 and S112 (S113). More specifically, the LCU 220 causes the correction amount calculating unit 223 and the drivers 224a and 224b to output, to the optical system drive actuator 230, a driving pulse signal according to the movement amounts in the X direction and the Y direction on the basis of the calculation results. In response to the driving pulse signal, the optical system drive actuator 230 moves the blur correcting lens group.

When the process of S113 is completed, the processing is terminated.

The processing illustrated in FIG. 8 represents one cycle of a blur correction operation performed by the lens unit 200. Actually, one cycle of the blur correction operation is repeated until an instruction to finish blur correction is transmitted from the system controller 340 to the LCU 220.

In the blur correction operation above in the camera system 100, when the lens unit 200 that can perform blur correction in the yaw direction and the pitch direction is mounted onto the camera body 300 that can perform blur correction in the yaw direction, the pitch direction, and the roll direction, blur correction is shared in such a way that the lens unit 200 performs blur correction in the yaw direction and the pitch direction, and that the camera body 300 performs blur correction in the roll direction. In this case, in the camera body 300, the X1 drive actuator 331 and the X2 drive actuator 332 can be used only to perform blur correction in the roll direction, and the X1 drive actuator 331 and the X2 drive actuator 332 are not used to perform blur correction in the yaw direction. Accordingly, a correction stroke used to perform blur correction in the roll direction can increase. In addition, the processing load on the blur correcting microcomputer 350 is reduced by not performing blur correction in the yaw direction and the pitch direction. Accordingly, a cycle in which blur correction in the roll direction is performed can also be shortened, as illustrated in FIG. 9, for example.

Figure 9:
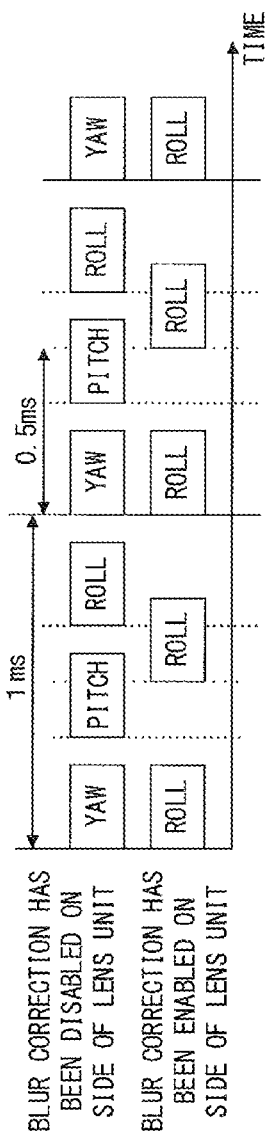
FIG. 9 is a diagram explaining examples of a blur correction cycle in a camera body in a case in which a lens unit mounted onto the camera body is a lens unit in which blur correction has been disabled and in a case in which the mounted lens unit is not a lens unit in which blur correction is disabled in the camera system according to the first embodiment.

FIG. 9 is a diagram explaining examples of a blur correction cycle in the camera body 300 in a case in which the lens unit 200 mounted onto the camera body 300 is a lens unit in which blur correction has been disabled and in a case in which the lens unit 200 is not a lens unit in which blur correction has been disabled.

In the example illustrated in FIG. 9, in the camera body 300, when the mounted lens unit 200 is a lens unit in which blur correction has been disabled, blur correction in three directions, the yaw direction, the pitch direction, and the roll direction, is performed once in a cycle of 1 ms. When the mounted lens unit 200 is not a lens unit in which blur correction has been disabled (when the mounted lens unit 200 is a lens unit in which blur correction has been enabled), blur correction in the roll direction is performed twice in a cycle of 1 ms (blur correction in the roll direction is performed once in a cycle of 0.5 ms).

As described above, by shortening a cycle of blur correction in the roll direction, responsiveness of blur correction in the roll direction can be improved.

As described above, in the camera system 100 according to this embodiment, when the lens unit 200 that can perform blur correction in the yaw direction and the pitch direction is mounted onto the camera body 300 that can perform blur correction in the yaw direction, the pitch direction, and the roll direction, blur correction is shared in such a way that the lens unit 200 performs blur correction in the yaw direction and the pitch direction and that the camera body 300 performs blur correction in the roll direction. By doing this, a correction stroke for blur correction in the roll direction can increase, and responsiveness of blur correction in the roll direction can be improved. Accordingly, a correction performance can be achieved that exceeds a correction performance in a case in which either the lens unit 200 or the camera body 300 performs blur correction.

Second Embodiment

A camera system according to a second embodiment is described next. In the description below, the same components as those in the camera system 100 according to the first embodiment are described by using the same reference numerals.

Figure 10:
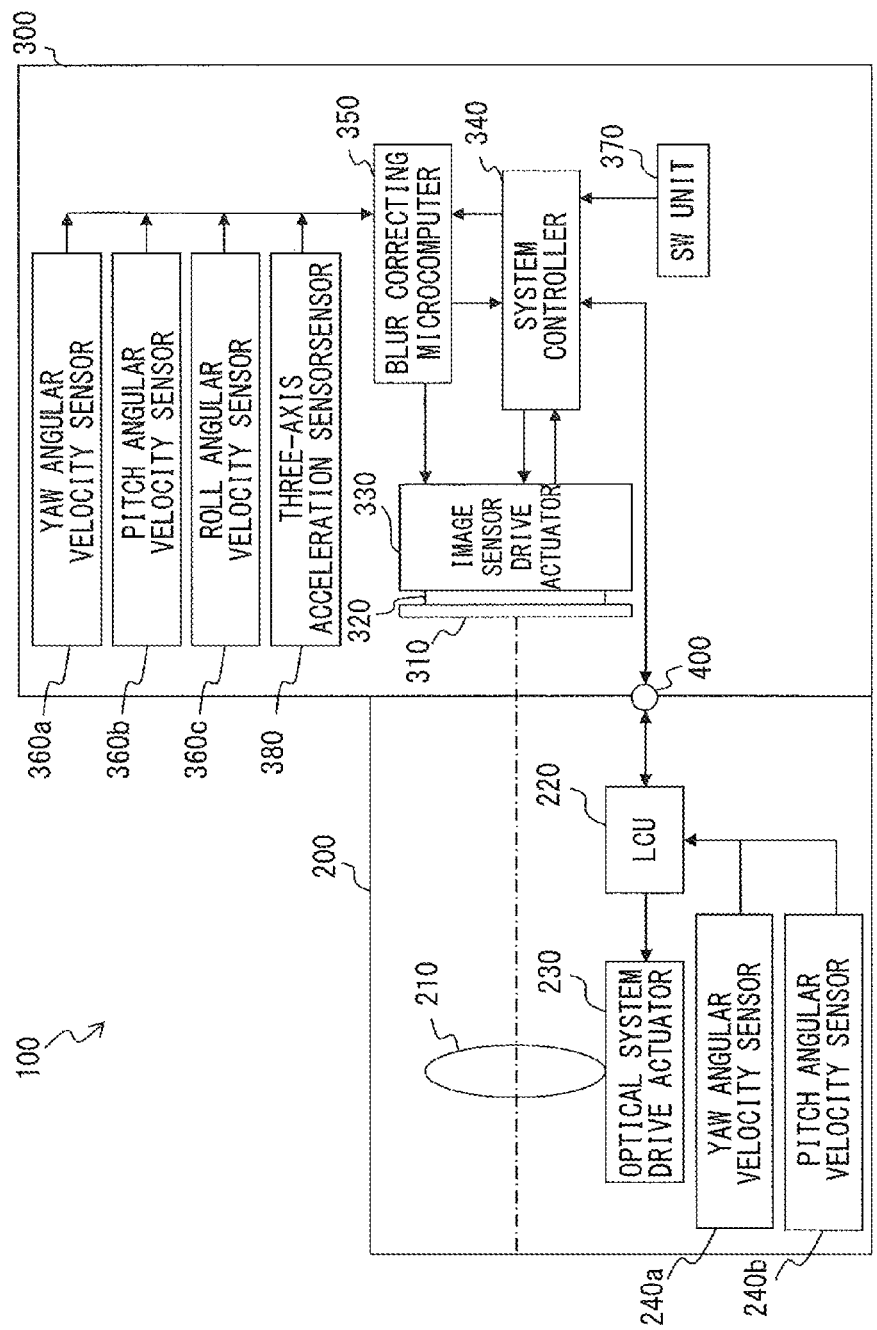
FIG. 10 illustrates an exemplary configuration of a camera system according to a second embodiment.

FIG. 10 illustrates an exemplary configuration of a camera system according to this embodiment.

As illustrated in FIG. 10, in a camera system 100 according to this embodiment, a camera body 300 includes a three-axis acceleration sensor 380 that detects accelerations in the X direction, the Y direction, and the Z direction in addition to the components in the camera system 100 illustrated in FIG. 2.

Accordingly, a blur correcting microcomputer 350 controls an image sensor drive actuator 330 to move an image sensor 320 in a direction in which image blur is cancelled on the basis of detection results of a yaw angular velocity sensor 360a, a pitch angular velocity sensor 360b, a roll angular velocity sensor 360c, and the three-axis acceleration sensor 380, or on the basis of a calculation result of the roll angular velocity sensor 360c, under the control of a system controller 340. The internal configuration of the blur correcting microcomputer 350 according to this embodiment is described below with reference to FIG. 11. When a lens unit 200 mounted onto a camera body 300 is a lens unit that can perform blur correction, an image blur amount associated with parallel blurring in the X direction and the Y direction based on the detection result of the three-axis acceleration sensor 380 is transmitted as a correction amount from the blur correcting microcomputer 350 via the system controller 340 to an LCU 220.

The LCU 220 controls an optical system drive actuator 230 to move a blur correcting lens group in a direction in which image blur is cancelled on the basis of angular velocities detected by a yaw angular velocity sensor 240a and a pitch angular velocity sensor 240b, or on the basis of the angular velocities detected by the yaw angular velocity sensor 240a and the pitch angular velocity sensor 240b and the correction amount transmitted from the system controller 340.

The other components illustrated in FIG. 10 are the same as the components illustrated in FIG. 2, and the description thereof is omitted.

In the camera system 100 according to this embodiment, the yaw angular velocity sensor 360a, the pitch angular velocity sensor 360b, the roll angular velocity sensor 360c, and the three-axis acceleration sensor 380 are examples of a blur detecting unit that detects blurring in a plurality of directions.

Figure 11:
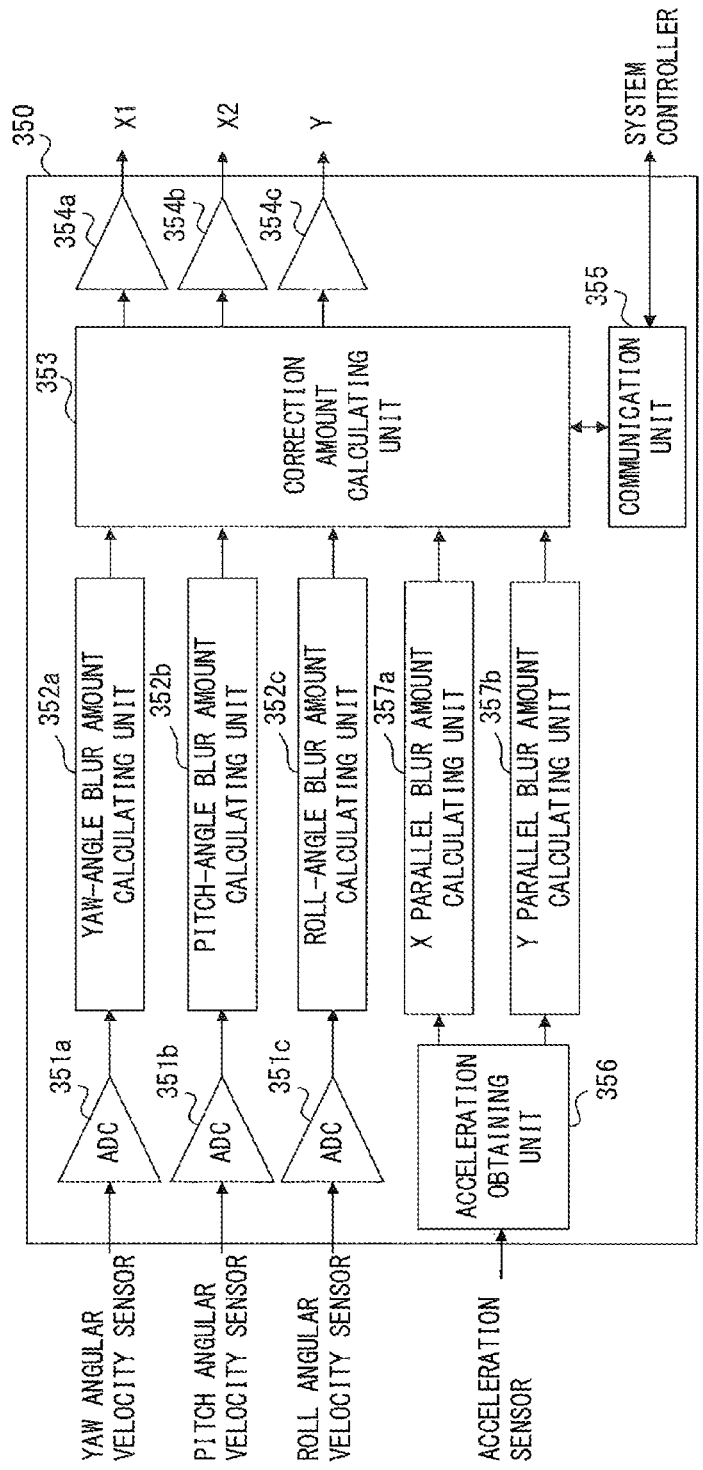
FIG. 11 illustrates an example of an internal configuration of a blur correcting microcomputer according to the second embodiment.

FIG. 11 illustrates an example of the internal configuration of the blur correcting microcomputer 350 according to this embodiment.

As illustrated in FIG. 11, the blur correcting microcomputer 350 according to this embodiment includes an acceleration obtaining unit 356, an X parallel blur amount calculating unit 357a, and a Y parallel blur amount calculating unit 357b in addition to the components in the blur correcting microcomputer 350 illustrated in FIG. 4.

The acceleration obtaining unit 356 periodically obtains accelerations in the X direction and the Y direction from the three-axis acceleration sensor 380.

The X parallel blur amount calculating unit 357a calculates an image plane movement amount in the X direction (an image blur amount associated with parallel blurring in the X direction) on the basis of the acceleration in the X direction that has been periodically obtained by the acceleration obtaining unit 356. The Y parallel blur amount calculating unit 357b calculates an image plane movement amount in the Y direction (an image blur amount associated with parallel blurring in the Y direction) on the basis of the acceleration in the Y direction that has been periodically obtained by the acceleration obtaining unit 356. Respective internal configurations of the X parallel blur amount calculating unit 357a and the Y parallel blur amount calculating unit 357b are described below with reference to FIG. 12.

Accordingly, the correction amount calculating unit 353 calculates respective movement amounts on the X1 axis, the X2 axis, and the Y axis to move the image sensor 320 in a direction in which image blur is cancelled, on the basis of calculation results of the yaw-angle blur amount calculating unit 352a, the pitch-angle blur amount calculating unit 352b, the roll-angle blur amount calculating unit 352c, the X parallel blur amount calculating unit 357a, and the Y parallel blur amount calculating unit 357b. The correction amount calculating unit 353 also calculates respective movement amounts on the X1 axis and the X2 axis to move the image sensor 320 in a direction in which image blur is cancelled, on the basis of a calculation result of the roll-angle blur amount calculating unit 352c. When the lens unit 200 mounted onto the camera body 300 is a lens unit that can perform blur correction, a communication unit 355 transmits, to the system controller 340, the calculation results of the X parallel blur amount calculating unit 357a and the Y parallel blur amount calculating unit 357b as a correction amount. The system controller 340 transmits the correction amount to the LCU 220.

The other components illustrated in FIG. 11 are the same as the components illustrated in FIG. 4, and the description thereof is omitted.

FIG. 12 illustrates an example of the internal configuration of each of the X parallel blur amount calculating unit 357a and the Y parallel blur amount calculating unit 357b.

As illustrated in FIG. 12, each of the X parallel blur amount calculating unit 357a and the Y parallel blur amount calculating unit 357b includes integrators 511 and 512 and a multiplier 513. The integrator 511 time-integrates an input acceleration so as to calculate velocity. The integrator 512 further time-integrates a calculation result of the integrator 511 so as to calculate a parallel movement amount. The multiplier 513 multiplies a calculation result of the integrator 512 by an optical characteristic (an image magnification of an optical system 210) so as to calculate an image plane movement amount. The image magnification is determined according to a focal length of the optical system 210, and information relating to the image magnification is included in information relating to an optical characteristic transmitted from the system controller 340. Of course, a method for calculating an image plane movement amount from an acceleration is not limited to the method illustrated in FIG. 12, and another method may be employed.

The LCU 220 according to this embodiment has an internal configuration similar to the internal configuration illustrated in FIG. 3, and therefore the internal configuration of the LCU 220 is not illustrated. When the correction amount (the calculation results of the X parallel blur amount calculating unit 357a and the Y parallel blur amount calculating unit 357b) is transmitted by the system controller 340, the correction amount calculating unit 223 calculates movement amounts in the X direction and the Y direction to move the blur correcting lens group in a direction in which image blur is cancelled, on the basis of calculation results of a yaw-angle blur amount calculating unit 222a and a pitch-angle blur amount calculating unit 222b or on the basis of the calculation results of the yaw-angle blur amount calculating unit 222a and the pitch-angle blur amount calculating unit 222b and the correction amount transmitted by the system controller 340. When the movement amounts are calculated as in the latter case, the movement amount in the X direction to move the blur correcting lens group is calculated, for example, by adding a value obtained by converting the calculation result of the yaw-angle blur amount calculating unit 222a into a movement amount in the X direction of the blur correcting lens group and a value obtained by converting the correction amount (the calculation result of the X parallel blur amount calculating unit 357a) into a movement amount in the X direction of the blur correcting lens group. Similarly, the movement amount in the Y direction to move the blur correcting lens group is calculated, for example, by adding a value obtained by converting the calculation result of the pitch-angle blur amount calculating unit 222b into a movement amount in the Y direction of the blur correcting lens group and a value obtained by converting the correction amount (the calculation result of the Y parallel blur amount calculating unit 357b) into a movement amount in the Y direction of the blur correction lens group.

The blur correction operation performed by the camera system 100 according to this embodiment is described next.

The blur correction operation is performed under the control of the system controller 340, similarly to the first embodiment. The following blur correction operations are respectively performed by the lens unit 200 and the camera body 300 during a period after an instruction to star blur correction is transmitted from the system controller 340 to the lens unit 200 and the camera body 300 and before an instruction to finish blur correction is transmitted from the system controller 340 to the lens unit 200 and the camera body 300. The blur correction operation performed by the camera body 300 is described first, and the blur correction operation performed by the lens unit 200 is described next.

Figure 13:
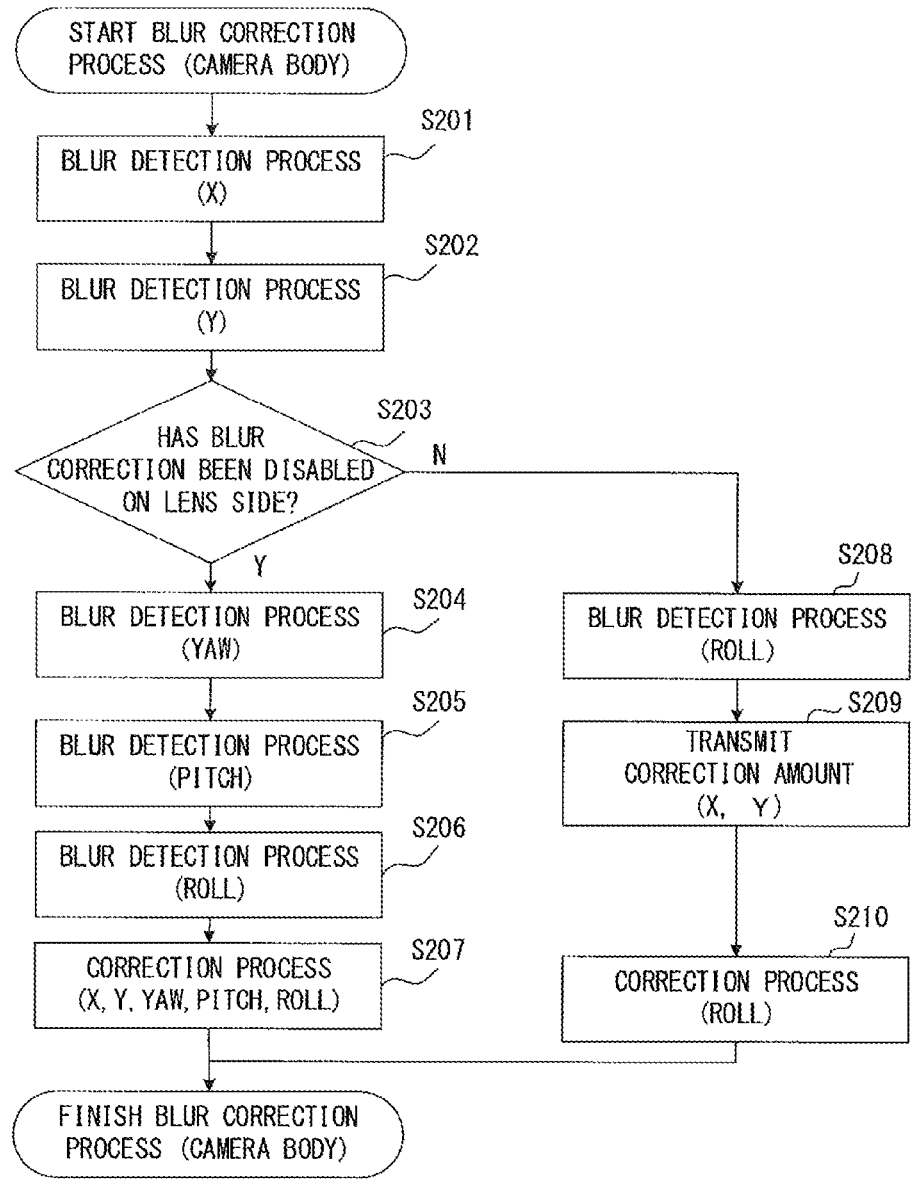
FIG. 13 is a flowchart illustrating the processing content of a blur correction operation performed by a camera body according to the second embodiment.

FIG. 13 is a flowchart illustrating the processing content of the blur correction operation performed by the camera body 300 according to this embodiment.

As illustrated in FIG. 13, the blur correcting microcomputer 350 that has received an instruction to start blur correction first performs a blur detection process in the X direction (S201). More specifically, the blur correcting microcomputer 350 causes the acceleration obtaining unit 356 and the X parallel blur amount calculating unit 357*a* to calculate an image plane movement amount in the X direction (an image blur amount associated with parallel blurring in the X direction) on the basis of a detection result of the three-axis acceleration sensor 380 (an acceleration in the X direction).

Then, the blur correcting microcomputer 350 performs a blur detection process in the Y direction (S202). More specifically, the blur correcting microcomputer 350 causes the acceleration obtaining unit 356 and the Y parallel blur amount calculating unit 357*b* to calculate an image plane movement amount in the Y direction (an image blur amount associated with parallel blurring in the Y direction) on the basis of a detection result of the three-axis acceleration sensor 380 (an acceleration in the Y direction).

The blur correcting microcomputer 350 determines whether the lens unit 200 mounted onto the camera body 300 is a lens unit in which blur correction has been disabled (S203). The process of S203 is similar to the process of S101 in FIG. 7, and the detailed description thereof is omitted.

When the determination result in S203 is Yes, the blur correcting microcomputer 350 performs a blur detection process in the yaw direction (S204), a blur detection process in the pitch direction (S205), and a blur detection process in the roll direction (S206). The processes of S204 to S206 are similar to the processes of S102 to S104 in FIG. 7, and the detailed description thereof is omitted. The blur correcting microcomputer 350 performs a blur correction process on the basis of calculation results in S201, S202, and S204 to S206 (S207). More specifically, the blur correcting microcomputer 350 causes the correction amount calculating unit 353 and the drivers 354*a*, 354*b*, and 354*c* to output, to the image sensor drive actuator 330, a driving pulse signal according to respective movement amounts on the X1, X2, and Y axes on the basis of the calculation results, and the image sensor drive actuator 330 moves the image sensor 320 in response to the driving pulse signal.

When the determination result in S203 is No, the blur correcting microcomputer 350 performs a blur detection process in the roll direction (S208). The process of S208 is similar to the process of S206, and the detailed description thereof is omitted. Then, the blur correcting microcomputer 350 transmits the calculation results in S201 and S202 (the image plane movement amounts in the X direction and the Y direction) as a correction amount to the system controller 340 (S209), and the system controller 340 transmits the calculation results in S201 and S202 to the LCU 220. The blur correcting microcomputer 350 performs a blur correction process on the basis of a calculation result in S208 (S210). The process of S210 is similar to the process of S107 in FIG. 7, and the detailed description thereof is omitted.

When the process of S207 or S210 is completed, the processing is terminated.

The processing illustrated in FIG. 13 represents one cycle of a blur correction operation that is performed by the camera body 300, similarly to the processing illustrated in FIG. 7. Actually, one cycle of the blur correction operation is repeated until an instruction to finish blur correction is transmitted from the system controller 340 to the blur correcting microcomputer 350.

Figure 14:
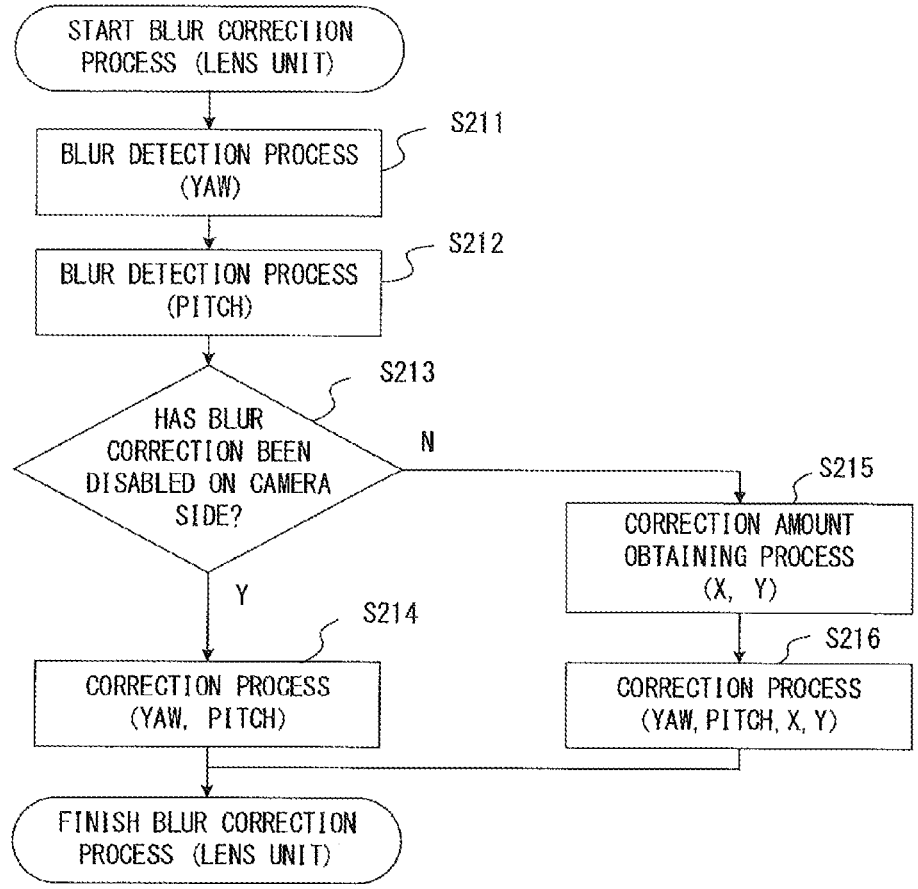
FIG. 14 is a flowchart illustrating the processing content of a blur correction operation performed by a lens unit according to the second embodiment.

FIG. 14 is a flowchart illustrating the processing content of the blur correction operation performed by the lens unit 200 according to this embodiment.

As illustrated in FIG. 14, the LCU 220 that has received an instruction to start blur correction first performs a blur detection process in the yaw direction (S211) and a blur detection process in the pitch direction (S212). The processes of S211 and S212 are similar to the processes of S111 and S112 in FIG. 8, and the detailed description thereof are omitted.

Then, the LCU 220 determines whether the camera body 300 mounted onto the lens unit 200 is a camera body in which blur correction has been disabled (S213). This determination is performed on the basis of, for example, information relating to the camera body 300 that is transmitted from the system controller 340. The camera body in which blur correction has been disabled refers to a camera body that cannot perform blur correction, and examples of the camera body include a camera body that does not have a blur correction function in the X direction, the Y direction, the yaw direction, the pitch direction, and the roll direction and a camera body having such a blur correction function in which the blur correction function has been disabled. The blur correction function can be disabled, for example, by a user operating an operating unit provided in the camera body.

When the determination result in S213 is Yes, the LCU 220 performs a blur correction process on the basis of calculation results in S211 and S212 (S214). The process of S214 is similar to the process of S113 in FIG. 8, and the detailed description thereof is omitted.

When the determination result in S213 is No, the LCU 220 obtains the correction amount (the image plane movement amounts in the X direction and the Y direction) that has been transmitted from the blur correcting microcomputer 350 via the system controller 340 in S209 of FIG. 13 (S215). The LCU 220 performs a blur correction process on the basis of the calculation results in S211 and S212 and the correction amount obtained in S215 (S216). More specifically, the LCU 220 causes the correction amount calculating unit 223 and the drivers 224*a* and 224*b* to output, to the optical system drive actuator 230, a driving pulse signal according to the movement amounts in the X direction and the Y direction on the basis of the calculation results and the correction amount, and the optical system drive actuator 230 moves the blur correcting lens group in response to the driving pulse signal.

When the process of S214 or S216 is completed, the processing is terminated.

The processing illustrated in FIG. 14 represents one cycle of a blur correction operation that is performed by the lens unit 200, similarly to the processing illustrated in FIG. 8. Actually, one cycle of the blur correction operation is repeated until an instruction to finish blur correction is transmitted from the system controller 340 to the LCU 220.

In the blur correction operation above of the camera system 100 according to this embodiment, when the lens unit 200 that can perform blur correction in the yaw direction and the pitch direction is mounted onto the camera body 300 that can perform blur correction in the X direction, the Y direction, the yaw direction, the pitch direction, and the roll direction, the camera body 300 performs blur detection, and the lens unit 200 performs blur correction in the X direction and the Y direction. In addition, blur correction in the yaw direction, the pitch direction, and the roll direction is shared in such a way that the lens unit 200 performs blur correction in the yaw direction and the pitch direction, and that the camera body 300 performs blur correction in the roll direction, similarly to the camera system. 100 according to the first embodiment. In this case, in the camera body 300, an X1 drive actuator 331 and an X2 drive actuator 332 are used only to perform blur correction in the roll direction, and the X1 drive actuator 331 and the X2 drive actuator 332 are not used to perform blur correction in the X direction and the yaw direction. Accordingly, a correction stroke used to perform blur correction in the roll direction can increase. In addition, a processing load on the blur correcting microcomputer 350 is reduced by not performing blur correction in the X direction, the Y direction, the yaw direction, and the pitch direction, and therefore a cycle in which blur correction in the roll direction is performed can be reduced. Consequently, responsiveness of blur correction in the roll direction can be improved.

As described above, in the camera system 100 according to this embodiment, when the lens unit 200 that can perform blur correction in the yaw direction and the pitch direction is mounted onto the camera body 300 that can perform blur correction in the X direction, the Y direction, the yaw direction, the pitch direction, and the roll direction, blur correction is shared in such a way that the lens unit 200 performs blur correction in the X direction, the Y direction, the yaw direction, and the pitch direction, and that the camera body 300 performs blur correction in the roll direction. By doing this, a correction stroke used to perform blur correction in the roll direction can increases, and responsiveness can also be improved. Accordingly, a correction performance can be achieved that exceeds a correction performance in a case in which either the lens unit 200 or the camera body 300 performs blur correction.

Third Embodiment

A camera system according to a third embodiment is described next. In the description below, the same components as the components in the camera system 100 according to the first embodiment are described by using the same reference numerals.

A camera system 100 according to this embodiment has a configuration similar to the configuration of the camera system 100 according to the first embodiment. However, the camera system 100 according to this embodiment does not perform blur correction in the roll direction, and therefore the camera system 100 according to this embodiment does not need to include components needed to perform blur correction in the roll direction.

Accordingly, a blur correcting microcomputer 350 controls an image sensor drive actuator 330 so as to move an image sensor 320 in a direction in which image blur is cancelled on the basis of angular velocities detected by a yaw angular velocity sensor 360a and a pitch angular velocity sensor 360b, or on the basis of the angular velocity detected by the pitch angular velocity sensor 360b.

An LCU 220 controls an optical system drive actuator 230 so as to move a blur correcting lens group in a direction in which image blur is cancelled on the basis of angular velocities detected by a yaw angular velocity sensor 240a and a pitch angular velocity sensor 240b, or on the basis of the angular velocity detected by the yaw angular velocity sensor 240a.

The other components are similar to the components in the camera system 100 according to the first embodiment, and the description thereof is omitted.

A blur correction operation of the camera system 100 according to this embodiment is described next.

The blur correction operation is performed under the control of a system controller 340, similarly to the first embodiment. The following blur correction operations are respectively performed by a lens unit 200 and a camera body 300 during a period after an instruction to start blur correction is transmitted from the system controller 340 to the lens unit 200 and the camera body 300 and before an instruction to finish blur correction is transmitted from the system controller 340 to the lens unit 200 and the camera body 300. The blur correction operation performed by the camera body 300 is described first, and the blur correction operation performed by the lens unit 200 is described next.

Figure 15:
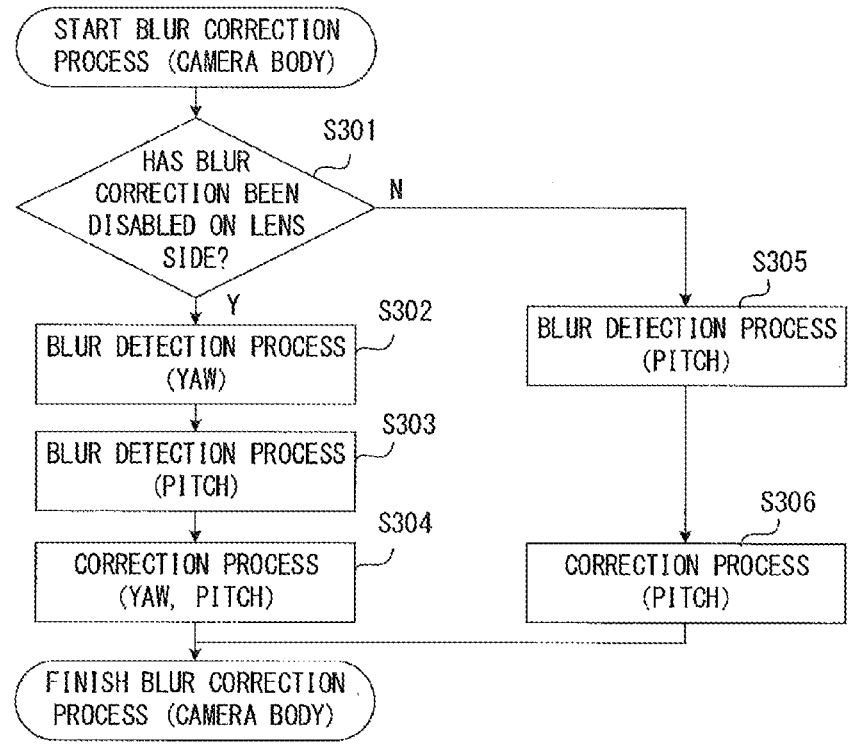
FIG. 15 is a flowchart illustrating the processing content of a blur correction operation performed by a camera body according to a third embodiment.

FIG. 15 is a flowchart illustrating the processing content of the blur correction operation performed by the camera body 300 according to this embodiment.

As illustrated in FIG. 15, the blur correcting microcomputer 350 that has received an instruction to start blur correction first determines whether the lens unit 200 mounted onto the camera body 300 is a lens unit in which blur correction has been disabled (S301). The process of S301 is similar to the process of S101 in FIG. 7, and the detailed description thereof is omitted.

When the determination result in S301 is Yes, the blur correcting microcomputer 350 performs a blur detection process in the yaw direction (S302) and a blur detection process in the pitch direction (S303). The processes of S302 and S303 are similar to the processes of S102 and S103 in FIG. 7, and the detailed description thereof is omitted. The blur correcting microcomputer 350 performs a blur correction process on the basis of calculation results in S302 and S303 (S304). More specifically, the blur correcting microcomputer 350 causes a correction amount calculating unit 353 and drivers 354a and 354b to output, to an image sensor drive actuator 330, a driving pulse signal according to respective movement amounts on the X1, the X2, and Y axes on the basis of the calculation results, and the image sensor drive actuator 330 moves the image sensor 320 in response to the driving pulse signal.

When the determination result in S301 is No, the blur correcting microcomputer 350 performs a blur detection process in the pitch direction (S305). The process of S305 is similar to the process of S303, and the detailed description thereof is omitted. The blur correcting microcomputer 350 performs a blur correction process on the basis of a calculation result in S305 (S306). More specifically, the blur correcting microcomputer 350 causes the correction amount calculating unit 353 and a driver 354c to output, to the image sensor drive actuator 330, a driving pulse signal according to a movement amount on the Y axis on the basis of the calculation result, and the image sensor drive actuator 330 moves the image sensor 320 in response to the driving pulse signal.

When the process of S304 or S306 is completed, the processing is terminated.

The processing illustrated in FIG. 15 represents one cycle of a blur correction operation that is performed by the camera body 300, similarly to the processing illustrated in FIG. 7. Actually, one cycle of the blur correction operation is repeated until an instruction to finish blur correction is transmitted from the system controller 340 to the blur correcting microcomputer 350.

Figure 16:
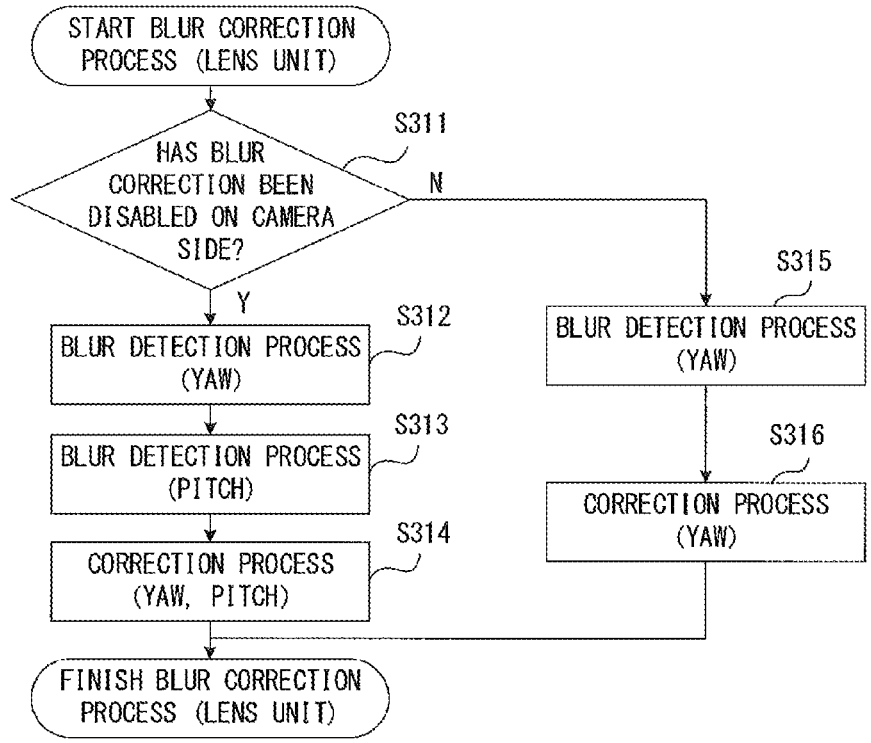
FIG. 16 is a flowchart illustrating the processing content of a blur correction operation performed by a lens unit according to the third embodiment.

FIG. 16 is a flowchart illustrating the processing content of the blur correction operation performed by the lens unit 200 according to this embodiment.

As illustrated in FIG. 16, the LCU 220 that has received an instruction to start blur correction first determines whether the camera body 300 mounted onto the lens unit 200 is a camera body in which blur correction has been disabled (S311). The determination of whether the camera body 300 is a camera body in which blur correction has been disabled is performed on the basis of, for example, information relating to the camera body 300 that has been transmitted from the system controller 340. The camera body in which blur correction has been disabled refers to a camera body that cannot perform blur correction, and examples of the camera body include a camera body that does not have a blur correction function in the yaw direction and the pitch direction and a camera body having such a blur correction function in which the blur correction function has been disabled.

When the determination result in S311 is Yes, the LCU 220 performs a blur detection process in the yaw direction (S312) and a blur detection process in the pitch direction (S313), and the LCU 220 performs a blur correction process on the basis of calculation results in S312 and S313 (S314). The processes of S312 to S314 are similar to the processes of S111 to S113 in FIG. 8, and the detailed description thereof is omitted.

When the determination result in S311 is No, the LCU 220 performs a blur detection process in the yaw direction (S315). The process of S315 is similar to the process of S312, and the detailed description thereof is omitted. The LCU 220 performs a blur correction process on the basis of a calculation result in S315 (S316). More specifically, the LCU 220 causes a correction amount calculating unit 223 and a driver 224a to output, to the optical system drive actuator 230, a driving pulse signal according to a movement amount in the X direction on the basis of the calculation result, and the optical system drive actuator 230 moves the blur correcting lens group in response to the driving pulse signal.

When the process of S314 or S316 is completed, the processing is terminated.

The processing illustrated in FIG. 16 represents one cycle of a blur correction operation that is performed by the lens unit 200, similarly to the processing illustrated in FIG. 8. Actually, one cycle of the blur correction operation is repeated until an instruction to finish blur correction is transmitted from the system controller 340 to the LCU 220.

In the blur correction operation above of the camera system 100 according to this embodiment, when the lens unit 200 that can perform blur correction in the yaw direction and the pitch direction is mounted onto the camera body 300 that can perform blur correction in the yaw direction and the pitch direction, blur correction is shared in such a way that the lens unit 200 performs blur correction in the yaw direction, and that the camera body 300 performs blur correction in the pitch direction. In this case, a processing load on the blur correcting microcomputer 350 is reduced by not performing blur correction in the yaw direction, and therefore, a cycle in which blur correction in the pitch direction is performed can be reduced, as illustrated in FIG. 17, for example. Similarly, a processing load on the LCU 220 is reduced by not performing blur correction in the pitch direction, and therefore, a cycle in which blur correction in the yaw direction is performed can be reduced.

FIG. 17 is a diagram explaining examples of a blur correction cycle in the camera body 300 in a case in which the lens unit 200 mounted onto the camera body 300 that can perform blur correction is a lens unit in which blur correction has been disabled and in a case in which the lens unit 200 is not a lens unit in which blur correction has been disabled.

In the examples illustrated in FIG. 17, in the camera body 300, when the mounted lens unit 200 is a lens unit in which blur correction has been disabled, blur correction in two directions, the yaw direction and the pitch direction, is performed once in a cycle of 1 ms. When the mounted lens unit 200 is not a lens unit in which blur correction has been disabled (when the lens unit 200 is a lens unit in which blur correction has been enabled), blur correction in the pitch direction is performed twice in a cycle of 1 ms (blur correction in the pitch direction is performed once in a cycle of 0.5 ms).

By reducing a blur correction cycle in the pitch direction, as described above, responsiveness of blur correction in the pitch direction can be improved.

Similarly, in the lens unit 200, when the mounted camera body 300 is a camera body in which blur correction has been disabled, blur correction in two directions, the yaw direction and the pitch direction, can be performed once in a cycle of 1 ms, and when the mounted camera body 300 is not a camera body in which blur correction has been disabled (when the mounted camera body 300 is a camera body in which blur correction has been enabled), blur correction in the yaw direction can be performed twice in a cycle of 1 ms (blur correction in the yaw direction is performed once in a cycle of 0.5 ms), although this is not illustrated.

As described above, by reducing a blur correction cycle in the yaw direction, responsiveness of blur correction in the yaw direction can be improved.

As described above, in the camera system 100 according to this embodiment, when the lens unit 200 that can perform blur correction in the yaw direction and the pitch direction is mounted onto the camera body 300 that can perform blur correction in the yaw direction and the pitch direction, blur correction is shared in such a way that the lens unit 200 performs blur correction in the yaw direction, and that the camera body 300 performs blur correction in the pitch direction. By doing this, responsiveness of blur correction in each of the yaw direction and the pitch direction can be improved. Accordingly, a correction performance can be achieved that exceeds a correction performance in a case in which either the lens unit 200 or the camera body 300 performs blur correction.

In the camera system 100 according to this embodiment, when the lens unit 200 that can perform blur correction in the yaw direction and the pitch direction is mounted onto the camera body 300 that can perform blur correction in the yaw direction and the pitch direction, blur correction may be shared in such a way that the lens unit 200 performs blur correction in the pitch direction, and that the camera body 300 performs blur correction in the yaw direction.

In addition, in the camera system 100 according to this embodiment, the camera body 300 may be a camera body that can perform blur correction in the yaw direction, the pitch direction, and the roll direction. In this case, when the lens unit 200 that can perform blur correction in the yaw direction and the pitch direction is mounted onto the camera body 300 above, blur correction is shared in such a way that the lens unit 200 performs blur correction in the yaw direction, and that the camera body 300 performs blur correction in the pitch direction and the roll direction. By doing this, similarly to the first embodiment, an X1 drive actuator 331 and an X2 drive actuator 332 can be used only to perform blur correction in the roll direction, and the X1 drive actuator 331 and the X2 drive actuator 332 are not used to perform blur correction in the yaw direction. Accordingly, a correction stroke used to perform blur correction in the roll direction can increase.

The camera systems 100 according to the first to third embodiments have been described above. However, various variations to the camera systems 100 according to the respective embodiments can be made.

As an example, in the camera systems 100 according to the respective embodiments, the image sensor drive actuator 330 in the camera body 300 may be configured to include one drive actuator in the X direction and two drive actuators in the Y direction instead of two drive actuators 331 and 332 in the X direction and one drive actuator 333 in the Y direction illustrated in FIG. 6. In this case, the image sensor 320 is moved in the X direction by being driven by the one drive actuator in the X direction, and the image sensor 320 is moved in the Y direction or rotated by being driven by the two drive actuators in the Y direction. In this case, in the camera system 100 according to the third embodiment, when the lens unit 200 that can perform blur correction in the yaw direction and the pitch direction is mounted onto the camera body 300 that can perform blur correction in the yaw direction, the pitch direction, and the roll direction, blur correction may be shared in such a way that the lens unit 200 performs blur correction in the pitch direction, and that the camera body 300 performs blur correction in the yaw direction and the roll direction. By doing this, the two drive actuators in the Y direction of the image sensor drive actuator 330 can be used only to perform blur correction in the roll direction, and the two drive actuators in the Y direction are not used to perform blur correction in the pitch direction. Accordingly, a correction stroke used to perform blur correction in the roll direction can increase.

The embodiments above have described specific examples of the present invention in order to easily understand the invention, and the present invention is not limited to the embodiments above. Various variations or modifications of the present invention can be made without departing from the spirit of the present invention specified in the claims.

As described above, according to the present invention, a camera system can be provided in which, when both a lens unit and a camera body have a blur correction function, the lens unit and the camera body share blur correction such that a correction performance can be achieved that exceeds a correction performance in a case in which either the lens unit or the camera body performs blur correction.

What is claimed is:

1. A camera system that includes a lens unit and a camera body that the lens unit is attached to or detached from, wherein
the camera body includes:
an image blur detecting unit that detects image blur in a plurality of directions, the image blur being associated with movement of the camera system in the plurality of directions;
an image blur correcting unit that performs image blur correction in the plurality of directions;
a determining unit that determines whether the lens unit mounted onto the camera body is a lens unit that performs the image blur correction; and
an image blur correction control unit that performs control in such a way that, when the determining unit determines that the lens unit mounted onto the camera body is the lens unit that performs the image blur correction, the image blur correcting unit performs the image blur correction only in specific directions from among the plurality of directions, the specific directions including at least a roll direction that is a direction of rotation with respect to an optical-axis direction of the lens unit, and that performs control in such a way that, when the determining unit determines that the lens unit mounted onto the camera body is not the lens unit that performs the image blur correction, the image blur correcting unit performs the image blur correction in the plurality of directions including the specific directions, and
the image blur correction control unit performs control in such a way that an image blur correction cycle in the specific directions when the image blur correcting unit performs the image blur correction only in the specific directions is shorter than the image blur correction cycle in the specific directions when the image blur correcting unit performs the image blur correction in the plurality of directions.

2. The camera system according to claim 1, wherein
when the determining unit determines that the mounted lens unit is a lens unit that performs the image blur correction, the camera body transmits, to the lens unit, an image blur correction amount according to image blur in a direction other than the specific directions from among the image blur in the plurality of directions, the image blur having been detected by the image blur detecting unit, and
the lens unit performs the image blur correction including correction of the image blur correction amount transmitted by the camera body.

3. The camera system according to claim 1, wherein
the specific direction is the roll direction that is the direction of the rotation with respect to the optical-axis direction of the lens unit.

4. The camera system according to claim 2, wherein
the specific direction is the roll direction that is the direction of the rotation with respect to the optical-axis direction of the lens unit, and
the image blur in the direction other than the specific directions, the image blur having been detected by the image blur detecting unit, is parallel blurring that is image blur based on the movement of the camera system in a horizontal direction and a vertical direction on an imaging plane.

5. The camera system according to claim 1, wherein
the plurality of directions include the roll direction, a first direction, and a second direction, the first direction and the second direction being two rotation directions that are perpendicular to the optical-axis direction of the lens unit,
the specific directions are the roll direction and the first direction,
when the determining unit determines that the mounted lens unit is the lens unit that performs the image blur correction, and when the lens unit performs the image blur correction in the two rotation directions, the lens unit performs the image blur correction only in the second direction,
when the image blur correcting unit performs the image blur correction only in the roll direction and the first direction, the image blur correction control unit performs control in such a way that the image blur correction cycle in the first direction is half of the image blur correction cycle in the first direction when the image blur correcting unit performs the image blur correction in the two rotation directions, and the image blur correction cycle in the second direction when the lens unit performs the image blur correction only in the second direction is half of the image blur correction cycle in the second direction when the lens unit performs the image blur correction in the two rotation directions.

6. The camera system according to claim 5, wherein the two rotation directions are two directions, a yaw direction and a pitch direction, that are rotation directions perpendicular to the optical-axis direction of the lens unit.

\* \* \* \* \*